3,778,421
PROCESS FOR PRODUCING RESINS OF WEATHER RESISTANCE

Hideo Hayashi, Kawasaki, and Hisatake Sato and Akio Oshima, Yokohama, Japan, assignors to Nippon Oil Company, Limited, Tokyo, Japan
Filed July 16, 1971, Ser. No. 163,177
Claims priority, application Japan, July 22, 1970, 45/63,563
Int. Cl. C08f 15/42
U.S. Cl. 260—82        5 Claims

ABSTRACT OF THE DISCLOSURE

A process for producing an aromatic hydrocarbon resin having excellent weather resistance and heat resistance which comprises separating a fraction containing a certain amount of conjugated diolefin and indene and indene alkyl derivatives from a hydrocarbon fraction having a boiling point of 140°–220° C. obtained from thermal cracking of petroleum, then adding Friedel-Crafts type catalysts to said fraction, subjecting to polymerization reaction at −30°–+60° C. for 10 minutes to 15 hours, thereafter decomposing and removing said catalyst and separating unreacted oils and low polymers from the reaction products by evaporation or distillation. Additionally, a process for concurrently producing the above-described resin and another aromatic hydrocarbon resin having a softening point of 160° C. or more, the two resins being polymerized products of two different fractions derived from the said hydrocarbon fraction having a boiling point of 140°–220° C., comprising separately polymerizing the said fractions in the manner described above.

---

Figure 1:
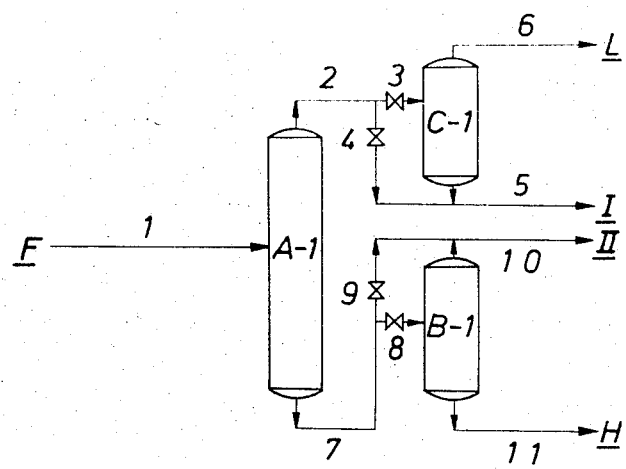

This invention relates to a process for producing a hydrocarbon resin having excellent weather resistance and heat resistance, as compared with well-known resins, from a thermal cracked petroleum fraction having the boiling point within a range of from 140° C. to 220° C.

In general, petroleum hydrocarbon resins are obtained by polymerizing liquid cracked petroleum fractions at room temperature, said fractions prepared by thermal cracking of petroleums. In these cases, a cracked petroleum fraction having a wide range of boiling point such as 20°–280° C., 20°–170° C., and 140°–280° C. is employed as a raw material. When a cracked petroleum fraction having a boiling point of about 20°–140° C. is used as a raw material, the resin obtained is called a non-aromatic hydrocarbon resin because it contains no aromatic ring. Since such a raw material contains a large amount of conjugated diolefins and non-conjugated diolefins, the resin produced has a high degree of unsaturation, so that the weather resistance of the resin is inferior. Therefore, the resulting resin cannot be employed as a coating material which needs weather resistance, particularly, for a light colored coating material. Furthermore, since the resin has a low softening point of 110° C. or below, it is unsuitable for printing ink, which needs a drying property, and for rapid drying coating material.

On the other hand, when a cracked petroleum fraction having a boiling point within the range of 140°–280° C. is used for a raw material, the resin produced is an aromatic resin. In this case, the weather resistance of the resin is also inferior, and when the resin is employed in white paint or traffic marking paint for road signs, conspicuous discoloration occurs in a short period. Therefore it is considered that the resin cannot be used for the uses mentioned above. Accordingly, it is an idea commonly accepted that petroleum hydrocarbon resins have inferior weather resistance.

The latter resin has a softening point of about 130° C. and this softening point is higher than that of the non-aromatic resin. However, when there is required a resin having a higher softening point, a component for elevating the softening point must be added to the raw material and then, polymerization of the mixture thus obtained is carried out.

In the coating material industry, particularly for traffic marking paint, there is needed a petroleum hydrocarbon resin having favorable water and chemical resistance and favorable weather resistance. Furthermore, there is a request for the preparation of a high softening point type petroleum hydrocarbon resin having a softening point of not less than 160° C. for high-grade printing ink in the printing ink industry.

At the present, neither need can be satisfied by the presently existing petroleum hydrocarbon resins.

It is an object of the present invention to provide a process for producing a weather resistant resin sufficiently applicable for the practical use as a resin for traffic paint.

A further object of the present invention is to provide a process for concurrently producing a weather resistant resin sufficiently applicable for the practical use as a resin for traffic marking paint with a high softening point of 160° C. and above which is requested in printing ink industry.

As a result of the detailed study of the present inventors as to the characteristic features of components in a raw material oil, it was found that by strictly separating specified components in the raw material oil as described hereinbelow, the weather resistant resin and high softening point type resin can be obtained from fractions I and II, respectively. The present inventors have further continued the study and development, and thus the process of the present invention has been accomplished.

The process according to the present invention is carried out as described hereinbelow. A fraction of a thermal cracked petroleum fraction having a boiling point within the range of from 140°–220° C. (unsaturated compounds contained therein are substantially styrene and its derivatives, indene and its derivatives), is employed as a starting material, and the starting material is subjected to distillation. A fraction which satisfies a condition such that the content of conjugated diolefin is 0.7 wt. percent and below, the rate of conjugated diolefin content is 3% or less, the total content of indene and its alkyl derivatives is 2 wt. percent or less and the rate of indene content is not more than 8% is obtained.

Said fraction is subjected to polymerization by employing Friedel-Crafts type catalyst. The catalyst is removed, and thereafter, unreacted petroleum fraction and low molecular polymer are eliminated by evaporation or distillation, whereby a hydrocarbon resin having excellent weather resistance is produced.

According to this invention, weather resistant resin for traffic paint and a resin having high softening point of 160° C. and above can be produced concurrently. That is, a fraction of a cracked petroleum fraction obtained by thermal cracking of petroleum having a boiling range of from 140°–220° C. (unsaturated compounds contained therein are substantially styrene and its derivatives, indene and its derivatives, is employed as a starting material, and the starting material is separated by a series of operations into fractions I and II which satisfy the undermentioned conditions, respectively. Fraction I satisfies a condition such that the content of conjugated diolefin is 0.7 wt. percent or less, the rate of conjugated diolefin content is 3% or less, the total content of indene and its alkyl derivatives is 2 wt. percent or less, and the rate of indene content is 8% or less. Fraction II satisfies a condition that the total content of indene and its alkyl derivatives is 20 wt. percent or more and the rate of indene content is 30% or more.

The fractions I and II are subjected to polymerization by employing Friedel-Crafts type catalyst, respectively. Then the used catalyst is removed, and thereafter, unreacted fraction and low molecular polymer are eliminated by evaporation or distillation, whereby a hydrocarbon resin having excellent weather resistance and heat resistance and a high softening point type hydrocarbon resin having a softening point of 160° C. and above are produced from the fractions I and II, respectively.

The term "a series of operations" used herein means that in a process for separating fraction I from fraction II, both of them satisfying the above determined conditions, respectively, from the raw material oil, its operations carried out in such a manner that no intermediate fraction between the fraction I and the fraction II substantially exists. This is one of the necessary conditions of the present invention.

The starting raw material oil employed in this invention is a cracked petroleum fraction having a boiling range of 140°–220° C. found in the by-products obtained when ethylene, propylene, butene, and butadiene are produced by thermal cracking such as steam cracking of petroleum fractions such as naphtha, kerosene, and light oil fractions.

As a result of analysis of components by gas chromatography as to the cracked oil fraction having a boiling point within the above described range, components having the following boiling point are representatively detected as shown in Table 1.

TABLE 1 COMPONENTS IN CRACKED OIL OF 140°–220° C FRACTION

| Name of component | Boiling point, °C. (760 mm. Hg abs) | Examples of content (wt. percent) |
|---|---|---|
| Styrene | 145.8 | 13–20 |
| Allylbenzene | 156–157 | 0.1–1 |
| α-Methylstyrene | 165.4 | 0.5–6 |
| β-Methylstyrene | 175 | 0.5–6 |
| p-Vinyltoluene | 168 | |
| m-Vinyltoluene | 169 | 10–20 |
| o-Vinyltoluene | 171 | |
| Indene | 182.2 | 2–11 |
| Methylindene homologs | 184–206 | |
| Dimethylindene and ethylindene homologs | <212 | 1–3 |
| Xylene (o-, m-, and p-isomers) | 138–142 | |
| Ethylbenzene | 136.2 | 17–10 |
| Isopropylbenzene | 152.5 | |
| Ethyltoluene (o-, m-, and p-isomers) | 158–164.6 | 18–7 |
| n-Propylbenzene | 159.6 | 1–0.1 |
| Trimethylbenzene (1,3,5-,1,2,4-, and 1,2,3- isomers) | 164.6–176.5 | 25–6 |
| Indane | 177 | 9–1 |
| Methylindane homologs | 182–203 | |
| Dimethyl and ethylindane homologs | <200 | 2–0.5 |
| Naphthalene | 218 | |
| Dicyclopentadiene[1] | 170 | 0.2–3 |
| Undetected component | 140–220 | 0.7–5.4 |

[1] There is a case in which a part or whole of the dicyclopentadiene is depolymerized by heating to produce cyclopentadiene.
[2] A part of the undetected component contains cyclopentadiene-methylcyclopentadiene co-dimer and methylcyclopentadiene dimer. There is a case in which a part or whole thereof is depolymerized by heating to produce cyclopentadiene and methycyclopentadiene, and it is possible to analyze these monomers by the above described gas chromatography.

In the above-mentioned components, the total of styrene and its derivatives, indene and its derivatives is considered as the polymerizable component. Furthermore, in case cyclopentadiene and methylcyclopentadiene are produced by heating and contained in the raw material oil as described in Notes 1 and 2 of Table 1, these monomers are also considered as polymerizable components.

In order to produce a hydrocarbon resin having a good weather resistance and heat resistance in the process according to this invention, it is an essential condition that the fraction having a boiling point within the range of 140°–220° C. be distilled and a fraction satisfying the following conditions obtained and that said fraction is employed as a raw material oil.

THE FRACTION (a) The total content of cyclopentadiene and methylcyclopentadiene, that is, the content of conjugated diolefin in the fraction separated from the above-mentioned starting raw material oil is adjusted to a value of 0.7 wt. percent or less and the rate of content of the conjugated diolefin defined in the following equation (1) is adjusted to 3% or less.

Rate of conjugated diolefin content (percent)
$$= \frac{\text{Conjugated diolefin content}^1 \text{ in the fraction I (wt. percent)}}{\text{Polymerizable component in the fraction (I) (wt. percent)}} \times 100 \quad (1)$$

(b) The total content of indene and its alkyl derivatives in the fraction separated from the above-mentioned starting raw material oil is adjusted to a value of 2 wt. percent or less and the rate of content of indene defined in the following Equation 2 is adjusted to 8% or less.

Rate of indene content (percent)
$$= \frac{\text{Content of indene and its alkyl derivatives in the fraction I (wt. percent)}}{\text{Polymerizable component in the fraction (I) (wt. percent)}} \times 100 \quad (2)$$

In order to concurrently produce a hydrocarbon resin having a good weather resistance and heat resistance with a high softening point type hydrocarbon resin having a softening point of 160° C. and above in the process according to this invention, it is an essential condition that the fraction having a boiling point within the range of 140°–220° C. is separated by the series of operations into the fractions I and II satisfying the following conditions, respectively, and that each fraction is employed as a raw material oil.

(1) The fraction I (a) The total content of cyclopentadiene and methylcyclopentadiene, that is, the content of conjugated diolefin in the fraction I separated from the above-mentioned starting raw material oil is adjusted to a value of 0.7 wt. percent or less and the rate of content of the conjugated diolefin defined in the Equation I is adjusted to 3% or less.

(b) The total content of indene and its alkyl derivatives in the fraction I separated from the above-mentioned starting raw material oil is adjusted to a value of 2 wt. percent or less and the rate of content of indene defined in the Equation 2 is adjusted to 8% or less.

(2) The fraction II (a) The total content of indene and its alkyl derivatives in the fraction II separated from the above-mentioned starting raw material oil is adjusted to a value of not less than 20 wt. percent and the rate of content of indene defined in the following Equation 3 is adjusted to not less than 30%.

Rate of indene content (percent)
$$= \frac{\text{Content of indene and its alkyl derivatives in the fraction II (wt. percent)}}{\text{Polymerizable component in the fraction II (wt. percent)}} \times 100 \quad (3)$$

Each component of the starting raw material oil, of the fractions I and II is analyzed by gas chromatography under the following conditions.

(i) Styrene, allylbenzene, 1,3,5-trimethylbenzene, and o-ethyltoluene are analyzed under such a condition that ---
[1] The conjugated diolefin content means the total content of cyclopentadiene and methylcyclopentadiene.

temperature is 100° C. and flow rate of helium is 60 cc./ min. by employing a column having a length of 3 m. in which "Celite" (manufactured by Johns-Manville Corp.) containing 20% by weight of "Apiezon L grease" (manufactured by Associated Electrical Industries Ltd.) is filled.

(ii) Each component other than those described in (i) is analyzed under such a condition that temperature is 125° C. and flow rate of 60 cc./mm. by employing a column having a length of 3 m. in which "Celite" containing 20% by weight of polyethylene glycol 4,000 is filled.

The total content of styrene, its alkyl derivatives, indene, its alkyl derivatives, cyclopentadiene, and methylcyclopentadiene analyzed by the above described method, is considered as a polymerizable component.

In the process of this invention, any distillation method, such as atmospheric distillation, vacuum distillation, and extractive distillation, may be used for the separation of the fraction I satisfying the above determined condition and the fraction II satisfying also the above determined condition from a cracked fraction having a boiling range of from 140° to 220° C.

One example of the separation process employed in the present invention will be described hereinbelow in connection with the accompanying drawing, but it is to be noted that the present invention is not limited to these separation processes.

Figure 2:
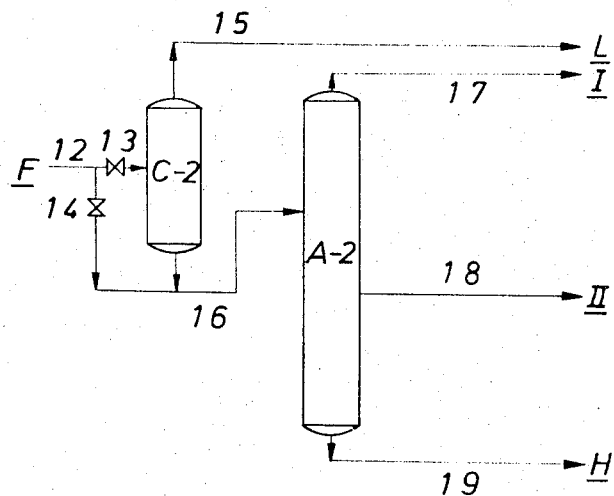

FIGS. 1 and 2 are flow diagrams showing examples of processes for preparing the raw material oil used in the process according to the present invention, respectively.

The separation process of the process according to this invention will be described by showing two examples in FIGS. 1 and 2 in which reference character F designates a cracked oil fraction having a boiling range of from 140°-220° C. used as a starting raw material oil, I and II designate the fractions I and II satisfying the above determined conditions, respectively. Reference character L indicates a lighter fraction than the fraction I, particularly, cyclopentadiene and methylcyclopentadiene fraction (hereinafter referred to simply as conjugated diolefin), and H indicates a heavier colored component than the fraction II and produced in the separation process as a by-product.

In FIG. 1, the starting raw material oil F is charged into a fractionator A-1 through line 1, and the fractionator A-1, can be operated at atmospheric or reduced pressure. In the tower A-1, an operation for adjusting the content of indene and its alkyl derivatives to less than 2 wt. percent which is one of the determined conditions for the fraction I is simultaneously carried out with another operation for adjusting the content of indene and its alkyl deratives to 20 wt. percent or more which is one of the determined conditions for the fraction II.

A product corresponding to the fraction I is distilled from the top of the tower A-1 through line 2. In case 0.7 wt. percent or more of the conjugated diolefin is contained in the starting raw material oil or the content of the conjugated diolefin in the distillate oil of the tower A-1 becomes 0.7 wt. percent or more by the depolymerization of dicyclopentadiene or dimer of methylcyclopentadiene or co-dimer of cyclopentadiene and methylcyclopentadiene (hereinafter referred to simply as "conjugated diolefin dimer") in the tower A-1, a valve 4 is closed and valve 3 is opened to charge starting raw material oil or the distillate of the tower A-1 into a tower C-1. Then, the conjugated diolefin L is caused to distill from the top of the tower C-1, while, a fraction in which the content of the conjugated diolefin is adjusted to 0.7 wt. percent or less is taken from the bottom of the tower C-1 and the fraction I is obtained through a line 5.

This operation can be easily carried out, because the boiling points of cyclopentadiene and methylcyclopentadiene which are conjugated diolefins are 42° C. and 70° C., respectively, and because these temperatures are lower than the initial boiling point of the starting raw material oil. In case the content of the conjugated diolefins in the distillate oil from the top of the tower A-1 is 0.7 wt. percent or less, the valve 3 is closed and the valve 4 is opened, and as a result, the fraction I can be directly obtained through the line 5 without employing tower C-1.

In case a colored substance having a boiling point of 220° C. and above is produced by heating in the tower A-1, a product corresponding to the fraction II to be taken from the bottom of the tower A-1 is charged into a tower B-1 through a line 7 by closing a valve 9 and opening a valve 8, and then the fraction II is obtained from the top of the tower B-1 through a line 10, and a colored substance H is drawn from the bottom of the tower B-1 through a line 11. In case the colored substance in the bottom component of the tower A-1 is a very small amount and negligible, the valve 8 is closed and the valve 9 is opened, and the fraction II may be obtained through the line 10 without employing the tower B-1.

In order to satisfy all the conditions, that is, the determined condition for the fraction I that the content and the rate of content of the conjugated diolefin are 0.7 wt. percent or less and 3% or less, respectively, and the content of indene and its alkyl derivatives and the rate of content of indene are 2 wt. percent or less and 8% or less, respectively, it is necessary that the amount of the polymerizable component is adjusted to the required amount or more by adopting an operation other than those described above. For this purpose, it is necessary to reduce the amount of the colored substance produced from various polymerizable components by heating in the tower A-1. Therefore, it is preferable to shorten the remaining time of the raw material oil in the bottom of the tower A-1 or to lower the temperature at the bottom of the tower by vacuum distillation. For example, conditions such that the remaining time of the raw material oil in the bottom of the tower is 0.5 hour or shorter in the case of atmospheric distillation, the residence time is within 1 hour at a temperature of 130° C. at the bottom of the tower in the case of vacuum distillation, and the residence time is not longer than 2 hours at a temperature of 100° C. at the bottom of the tower in the case of vacuum distillation are suitable for carrying out the process according to the present invention.

On the other hand, the operation such that the content of indene and its alkyl derivatives and the rate of content of indene are adjusted to values of not less than 20 wt. percent and not less than 30%, respectively, can be attained by selecting the distillation conditions in the tower A-1.

In the example of FIG. 2, when 0.5 wt. percent or more of the conjugated diolefin is already contained in the starting raw material oil F, the raw material oil F is charged into a fractionator C-2 through a line 12 and a valve 13. Then, the conjugated diolefins are caused to distill from the top of the fractionator while an oil is drawn off from the bottom of the tower. The thus drawn off oil is charged into a fractionator A-2 through a line 16. When the content of the conjugated diolefin in the raw material oil F is 0.7 wt. percent or less, the raw material oil F may be charged into the tower A-2 through a line 12, a valve 14, and a line 16.

In the tower A-2, the oil is separated into the fractions I and II, respectively, by the series of operations, and in this case, it is preferable that distillation at reduced pressure is carried out at a temperature of 170° C. and below at the bottom of the tower A-2 in order to satisfy each determined condition of the fractions I and II. The fraction I can be obtained from the top of the tower A-2 through a line 17, the fraction II can be obtained from the side of the tower A-2 through a line 18, and the colored substance H is taken from the bottom of the tower through a line 19.

In the processes exemplified above, the separation of the fractions I and II satisfying the above determined conditions, respectively, can be attained by the adoption of the series of operations. Furthermore, in the process of the present invention, separation processes other than those exemplified above may be adopted as long as the separation is carried out by separating operations in which an intermediate fraction is not produced between the fraction I and fraction II.

The fraction I and fraction II prepared as mentioned above are used as raw materials, respectively, and 0.01–5 wt. percent of Friedel-Crafts type catalysts such as boron trifluoride, aluminum chloride, and complex compound of boron trifluoride and phenol, preferably, boron trifluoride, boron trifluoride etherate, and boron trifluoride phenolate is added to each raw material oil, respectively, the resulting mixture is polymerized at a temperature ranging of $-30°-+60°$ C. for a period ranging of 10 minutes–15 hours. Then, the catalysts are decomposed and removed with alkalis such as caustic soda and sodium carbonate, if necessary, the thus treated reaction product is washed with water, and further, unreacted oil and low molecular weight polymer are separated from the reaction product by evaporation or distillation. As a result, an aromatic hydrocarbon resin having a softening point of 60°–120° C. a bromine value of 15 or less, and excellent weather resistance and thermal resistance can be obtained from the fraction I, and another high softening point type aromatic hydrocarbon resin having a softening point of 160° C. and above and a bromine value of not more than 30 can be obtained from the fraction II.

The softening point of the resin is measured in accordance with JIS (Japanese Industrial Standards) K 2531–1960 and weather resistance thereof is measured by the following means. A composition prepared by kneading each component shown in the following Table 2 is applied on a glass plate in a thickness of 5 mil. The thus obtained coated film is dried by leaving it for 7 days as it is, and an accelerated weathering test in which ultraviolet ray carbon arc radiation accompanied by rainfall for 18 min. by every 102 min. at a temperature of $63\pm3°$ C. is carried out with respect to the dried film for 160 hours in accordance with a method of JIS K 5400–1970. After the test, a film in which the 60 degree specular gloss (JIS K 5400–1970) is 60% or more and yellowness (JIS K 5400–1970) is 0.1 or less, there being no cracking and blistering, and there being substantially no difference between the film before and after the test is considered good weather resistance.

TABLE 2

Compounding ratio of paint for test

|  | Wt. percent |
|---|---|
| Sample resin | 20.0 |
| Safflower oil modified alkyd resin having oil length of 51% | 4.6 |
| Calcium carbonate | 18.5 |
| Titanium white | 13.0 |
| Zinc white | 5.5 |
| Xylene | 38.4 |
| Total | 100.0 |

The heat resisting test of the resin is carried out in such a manner that 40 gr. of a sample resin placed in a glass beaker having a volume of 100 cc., heated to a temperture of 200° C. to be molten, the thus molten resin is stirred in the open air, and after 5 hours, the color of the resin is measured (2 gr. of so-treated resin is dissolved in 25 cc. of benzene, and the color of the mixture is compared with Gardner standard scale in accordance with ASTM D). In this case, when the resin has a value of not more than 4 of color, it is considered to have good heat resistance.

In the process of this invention, a resin obtained by the polymerization, under the above-mentioned polymerization conditions, from a raw material in which at least one limitation value of the four determined limitations for the fraction I that the content of the conjugated diolefin and the rate of content of the conjugated diolefin are not more than 0.7 wt. percent and 3%, respectively, and the content of indene and its alkyl derivatives and the rate of content of indene are not more than 2 wt. percent and 8%, respectively, is outside the determined limitations has inferior weather resistance and heat resistance, and particularly, the color of the resin becomes very yellowish. Accordingly, such a resin is unsuitable for, for example, traffic paint in which severe weather resistance and heat resistance are required.

On the other hand, in the process according to the present invention, when a raw material having a content of 20 wt. percent or less of indene and its alkyl derivatives and a rate of content of 30% or less of indene which are outside the determined limitations for the fraction II is employed and is polymerized under the above-mentioned polymerization conditions, the resulting resin has a softening point of 160° C. and below, and accordingly, comparing this resin with that having a softening point of 160° C. and above prepared by the process according to this invention, the former resin has a longer setting time and drying time and inferior gloss and abrasion resistance in use as the resin for printing ink.

The characteristic features of the process of the present invention will be described hereinbelow.

(1) According to the process of the present invention, an aromatic hydrocarbon usable for the traffic paint having excellent weather resistance and heat resistance can be obtained.

(2) According to the process of the present invention, in spite of employing the same raw oil as in a production of publicly known aromatic petroleum resin as its starting raw material oil, two types of highly valuable resins such as weather resistant resin which cannot be attained from publicly known aromatic petroleum resins, and high softening point resin having a softening point of 160° C. and above can be concurrently obtained by separating the fraction I from the fraction II by the series of operations so as to satisfy the above determined conditions and polymerizing these fractions, respectively.

(3) Since the separation is carried out by the series of operations so as not to produce an intermediate fraction between the fractions I and II, a starting raw material oil can be effectively used and two types of resin having excellent properties can be obtained in a very high yield with respect to the starting raw material oil.

(4) In order to obtain a resin having excellent weather resistance which cannot be attained by heretofore publicly known petroleum resins and the high softening point type resin having a softening point as high as 160° C., it is unnecessary to use additionally an expensive third component besides the condition that a cracked oil fraction having a boiling range of 140°–220° C. is employed as its starting raw material oil, and accordingly, the process of the present invention is very advantageous from an industrial viewpoint.

(5) Since the separation process for the fraction I and fraction II satisfying the above determined conditions can be carried out by a simple operation, for example, distillation, the apparatus required for carrying out the operation may be a simple one and a cost for requiring the production can be reduced.

According to the process of the present invention, the hydrocarbon resin having excellent weather resistance and heat resistance and the high softening point type hydrocarbon resin having a softening point of 160° C. and above can be obtained, and the weather resistant type resin exhibits its characteristic features when it is used for a resin for a melting type traffic paint in which weather resistance and heat resistance are particularly required.

The compounding ratio for the weather resistant resin according to the present invention employed for melting type traffic marking paint is:

| | Parts by weight |
|---|---|
| Weather resistant resin of this invention | 24–49 |
| Maleic acid resin | 0–14 |
| Plasticizer | 1–10 |
| Pigment and filler | 50–75 |

For the plasticizer, any of those which can plasticize the resin and lower and adjust the viscosity at its molten state of the resin, such as dibutyl phthalate, dioctyl phthalate, alkyd resin, and paraffin wax, may be employed.

For the pigments and fillers, one can use titanium oxide, calcium carbonate, zinc white, and quartz sand powder. These compositions can serve as a traffic paint by heating and melting them or mixing them in powdered form. Furthermore, when glass beads are employed, the required amount of the glass beads may be added to the mixture of the above described compounding ratio. On the other hand, when a solvent volatile type traffic marking paint is prepared, a suitable solvent, such as hydrocarbon solvent, may be added to the above-mentioned mixture to knead them.

These traffic marking paints prepared as mentioned above are applied on the surface of a road, by heating and melting the paint at a temperature of 180°–220° C. in the case of a melting type traffic marking paint and by heating or at a room temperature in the case of a solvent volatile type paint. The traffic marking paint in which the weather resistant resin of this invention is employed has excellent heat resistance. Accordingly, there is no deterioration and discoloring at the time of heating and melting it, and furthermore, since the weather resistance of a coated film with the paint is excellent, there is no discoloring, cracking, and blistering. In addition, durabilities, such as water resistance and abrasion resistance, are also excellent.

The weather resistant resin of the present invention can not only be used for a traffic marking paint, but also in alkyd resin paint and oil varnish, and the resin exhibits its excellent characteristic features in these uses.

When the hydrocarbon resin having a softening point of 160° C. and above and produced concurrently with the above-mentioned weather resistant resin by the process of the present invention is used for a printing ink such as offset ink and gravure ink in which particularly rapid drying properties and gloss are required, excellent effects or advantages can be obtained as compared with conventional hydrocarbon resins.

In the case of offset ink, when a part or whole of rosin modified phenol resin heretofore widely employed is replaced by the high softening point resin having a softening point of 160° C., and above, and produced by the process according to this invention, the setting time and drying time of the resulting offset ink can be shortened and the gloss of the resulting printed surface can be increased.

Furthermore, in the case of gravure ink, when a part or whole of limed rosin varnish heretofore commonly used is replaced by the high softening point resin of the present invention, the resulting gravure ink becomes rapid drying and its gloss and abrasion resistance can be elevated.

In the following, several examples are disclosed in order to clarify the features of the present invention. However, it will be understood that these shall be interpreted as illustrative only, not as limitative of the invention.

EXAMPLE 1

A cracked oil fraction F having a boiling point of 140° to 220° C. which was obtained as a by-product of steam cracking of naphtha, was subjected to gas chromatography, and the result thereof was as follows:

| | |
|---|---|
| Polymerizable components (wt. percent) | 47.8 |
| Content of cyclopentadiene plus methylcyclopentadiene (wt. percent) | 1.8 |
| Content of indene plus its alkyl derivatives (wt. percent) | 9.0 |
| Content of dicyclopentadiene (wt. percent) | 0.4 |
| Rate of conjugated diolefin content (percent) | 3.8 |
| Rate of indene content (percent) | 18.8 |

This fraction F was fractionated into two fractions of fraction I and fraction II by using the towers as shown in FIG. 1. The specifications and the operating conditions of the fractionator A–1, C–1 and B–1 are shown in the following Table 3.

TABLE 3.—SPECIFICATIONS AND OPERATING CONDITIONS OF FRACTIONATORS

| Fractionators | A-1 | C-1 | B-1 |
|---|---|---|---|
| Type of tray | (1) | (2) | (2) |
| Number of trays | 30 | 7 | 5 |
| Feed tray (from the bottom) | 18 | 4 | 2 |
| Feed temperature (° C.) | 108 | 55 | 180 |
| Bottom pressure (mm. Hg, abs.) | 120 | 110 | (3) |
| Bottom temperature (° C.) | 145 | 120 | 225 |
| Top temperature (° C.) | 93 | 25 | 187 |
| Top pressure (mm. Hg, abs.) | 68 | 95 | (3) |
| Reflux ratio | 5.0 | 2.0 | 0.5 |
| Residence time at bottom (hr.) | 1.0 | 0.5 | 0.7 |

[1] Sieve.
[2] Bubble cap.
[3] Normal pressure.

Each tower A–1, C–1 and B–1 was provided with a heater on the feed line, with a condenser on the overhead line and with a reboiler at the bottom. Using the set of towers as shown in FIG. 1, the cracked oil fraction F was fed into the tower A–1 from the line 1 through a heater (not shown), then the overhead from the tower A–1 was cooled and condensed by a condenser (not shown), a part of the overhead taken from the condenser was refluxed into the top of the tower A–1 and the remainder was fed into the tower C–1 through the valve 3 and a heater (not shown). Thus, a light oil fraction L and the fraction I were obtained. The fraction from the bottom of the tower A–1 was fed into the tower B–1 through a heater (not shown) and the valve 8. From the top of the tower B–1, the cooled fraction II was obtained through a condenser (not shown), and from the bottom of said tower, a colored substance H was obtained. The material balance of these fractions obtained by said series of operations and the compositions of the fractions I and II are shown in the following:

MATERIAL BALANCE OF FRACTIONS

| | Wt. percent |
|---|---|
| Cracked oil fraction F | 100 |
| Fraction I | 58 |
| Fraction II | 32 |
| Light fraction L | 7 |
| Colored substance H | 3 |

COMPOSITION OF FRACTION I

| | |
|---|---|
| Polymerizable components (wt. percent) | 42.00 |
| Content of cyclopentadiene plus methylcyclopentadiene (wt. percent) | 0.40 |
| Content of indene plus its alkyl derivatives (wt. percent) | 1.01 |
| Rate of conjugated diolefin content (percent) | 0.95 |
| Rate of indene content (percent) | 2.40 |

COMPOSITION OF FRACTION II

| | |
|---|---|
| Content of polymerizable component (wt. percent) | 71.50 |
| Content of indene plus its alkyl derivatives (wt. percent) | 26.20 |
| Rate of indene content (percent) | 46.70 |

EXAMPLE 2

To the fraction I as obtained in Example 1 was added 0.5 wt. percent of boron trifluoride phenol complex as catalyst, and polymerization was carried out for 3 hours at 20° C. Then the product was washed with aqueous solution of sodium hydroxide to remove the catalyst and then washed with water. Further, unreacted oil and low polymer were removed from the product by distillation, and a weather resistant resin I–A was obtained. The yield of the resin I–A to the raw material oil fraction I was 39.0 wt. percent, the softening point was 105° C. and the bromine value (ASTM D–1158–57T) was 7. Further, said resin was subjected to accelerated weather resistance test for 160 hours and the resultant degree of yellowing was 0.020, that is the yellowing was hardly observed and the condition of the coating film was almost the same as that of before the test.

EXAMPLE 3

To the fraction II as obtained in Example 1 was added 0.4 wt. percent of boron trifluoride diethyl ether complex as catalyst, and polymerization was carried out for 3 hours at 10° C. The resultant product was treated with the same manner as in Example 2 to obtain a resin II–A. The yield of the resin II–A to the fraction II as used was 49.2 wt. percent and the obtained resin was a high softening point hydrocarbon resin having a softening point of 167° C. and bromine value of 22.

Comparative Example 1

The cracked oil fraction F as used in Example 1 was polymerized in the same conditions of Example 2 and Example 3, and obtained a resin F–1 having a softening point of 121° C. and a bromine value of 20, and a resin F–2 having a softening point of 132° C. and a bromine value of 23.

In the process of Example 1, the composition of the overhead product of the tower A–1 (not passed through the tower C–1) was as follows:

Polymerizable components (wt. percent) _____ 43.5
Content of cyclopentadiene plus methylcyclopentadiene (wt. percent) _____ 2.30
Content of indene plus its alkyl derivatives (wt. percent) _____ 0.90
Rate of conjugated diolefin content (percent) _____ 5.29
Rate of indene content (percent) _____ 2.06

The above fraction was polymerized in the same condition as in Example 2 and a resin F–3 having a softening point of 107° C. and a bromine value of 27 was obtained.

And also, conjugated diolefins were removed from the cracked oil fraction F using the tower C–1 alone, as shown in FIG. 1. The composition of the bottom product was as follows:

Polymerizable components (wt. percent) _____ 48.0
Content of cyclopentadiene plus methylcyclopentadiene (wt. percent) _____ 0.35
Content of indene plus its alkyl derivatives (wt. percent) _____ 9.60
Rate of conjugated diolefin content (percent) _____ 0.73
Rate of indene content (percent) _____ 20.0

The above fraction was polymerized in the same condition as in Example 2 and obtained a resin F–4 having a softening point of 120° C. and a bromine value of 6.

The resins F–1, F–3 and F–4 were subjected to the aforementioned accelerated weather resistance tests and the resultant degrees of yellowing were 0.212, 0.201, and 0.204, respectively, which were observed to be considerably yellowish.

EXAMPLE 4

The resin I–A obtained in Example 2 in accordance with the present invention and the resins F–1, F–3, and F–4 as obtained in Comparative Example 1 were subjected to the aforementioned heat resistance tests. The results are shown in the following Table 4.

TABLE 4.—HEAT RESISTANCE TESTS

[The numerals indicate the color of resins by the Gardner scale]

| Test time (hr.) | 0 | 1 | 2 | 3 | 4 | 5 |
|---|---|---|---|---|---|---|
| Resin: | | | | | | |
| I–A | 1− | 1 | 1 | 1+ | 2− | 2 |
| F–1 | 3 | 4 | 5 | 6 | 7 | 8 |
| F–3 | 3 | 4 | 5 | 5+ | 6+ | 7+ |
| F–4 | 2 | 3 | 4 | 4+ | 5+ | 7 |

As will be understood from the results in Table 4, the heat resistant resin I–A prepared in accordance with the method of the present invention is far superior than the resins F–1, F–3 and F–4 in viewpoints of the color before the tests and the changes of the color during the tests.

Then, traffic marking paints were prepared using these resins according to the following compounding ratios.

Wt. percent

Resin (I–A, F–1, F–3 or F–4) _____ 25
Maleic acid resin (acid value: 65, softening point: 120° C.) _____ 7
Safflower oil modified alkyd resin (oil length: 70) __ 4
Dioctyl phthalate (DOP) _____ 2
Pigment _____ 62

Each of the above compounds was heated and mixed well for 2 hours at 180° C., then was applied onto a surface of concrete to form a coating film of 0.5 mm. in thickness. Each coating film was subjected to 160 hours' accelerated weather resistance test, the results thereof are shown in the following Table 5.

TABLE 5.—ACCELERATED WEATHER RESISTANCE TEST

| Tests | Resins used | | | |
|---|---|---|---|---|
| | I–A | F–1 | F–3 | F–4 |
| Degree of yellowing: | | | | |
| Initial | 0.001 | 0.002 | 0.002 | 0.001 |
| After 160 hrs | 0.018 | 0.232 | 0.212 | 0.205 |
| 60 degree specular gloss: | | | | |
| Initial | 70 | 70 | 71 | 70 |
| After 160 hrs | 65 | 40 | 38 | 37 |
| 45, 0 degree daylight apparent reflectance: | | | | |
| Initial | 75 | 74 | 73 | 74 |
| After 160 hrs | 74 | 65 | 2 | 60 |
| Appearance (cracks, blisters) | Good | Crack | Crack | Good |

As shown in Table 5, the traffic marking paint prepared by using the resin I–A of the present invention, is superior in the degree of yellowing, and the lowering of the 60 degree specular gloss is very little, that is, the weather resistance of said paint is superior. On the other hand, the results of the traffic marking paints which were prepared by using the resins F–1, F–3 and F–4 were worse, where the raw material oils of the resins F–1, F–3, and F–4 do not meet one or more of the definitions of the fraction I, i.e., the conjugated diolefin content, the rate of conjugated diolefin content, the indene and its alkyl derivative content, and the rate of indene content.

And further, a traffic marking paint prepared by using the resin I–A of the present invention was compared with a traffic marking paint in the market which contains maleic acid resin. As the result of an immersing test in water for one month, the water resistance of the former was superior and there was not observed any cracks or blister. On the other hand, occurrence of cracks was observed in the latter.

EXAMPLE 5

Two kinds of offset printing ink were prepared by using the high softening point resin II–A as obtained in Example 3 and the resin F-2 as obtained in Comparative Example 1. The compositions of the inks were as follows:

| Composition | I | II |
|---|---|---|
| Resin II-A | 32 | |
| Resin F-2 | | 32 |
| Rosin modified phenol resin | 15 | 15 |
| Linseed oil | 22 | 22 |
| Hydrocarbon solvent for inks | 31 | 32 |

The above compositions were fused at 200° C. to obtain varnishes, and pigment and metallic drier were added and kneaded further to prepare offset printing inks. The inks were applied onto art paper by a test printer and were subjected to the tests of drying times and glosses, the test results are shown in the following Table 6.

TABLE 6.—PRINTING TESTS

| Composition | I | II |
|---|---|---|
| Setting time (min.): | | |
| Yellow | 8 | 15 |
| Red | 4 | 17 |
| Yellow and red, double imprint | 18 | 53 |
| Drying time hr.: min.): | | |
| Yellow | 4.20 | 6.30 |
| Red | 5.30 | 6.50 |
| Yellow and red, double imprint | 5.10 | 7.00 |
| Gloss (60 degree specular gloss): | | |
| Yellow | 69.0 | 57.0 |
| Red | 67.0 | 52.0 |
| Yellow and red, double imprint | 73.0 | 59.0 |

As clearly shown in Table 6, in the case of the offset printing ink prepared by using the high softening point resin of the present invention, the setting time and the drying time are short and the gloss is good as compared with the case in which other hydrocarbon resins are used. Further, it was observed that the setting time and the gloss of the ink prepared from composition I was superior as compared with the offset printing inks on the market which were prepared by using rosin modified phenol resin.

What is claimed is:

1. A process for concurrently producing (1) an aromatic hydrocarbon resin having excellent weather resistance and heat resistance, a softening point of 60°–120° C. and a bromine value of 15 or less, and (2) an aromatic hydrocarbon resin having a softening point of 160° C. or more and a bromine value of not more than 30 which comprises separating a hydrocarbon fraction having a boiling point within the range of 140°–220° C. obtained from the thermal cracking of petroleum into (i) a first fraction in which the content of conjugated diolefin is 0.7 weight percent or less, the rate of conjugated diolefin content is 3% or less, the total content of indene and its alkyl derivatives is 2 weight percent or less and the rate of indene content is 8% or less; and (ii) a second fraction in which the content of indene and its alkyl derivatives is 20 weight percent or more and the rate of indene content is 30% or more;

separately polymerizing said first and second fractions at a temperature of from −30° to +60° C. for a period of time from 10 minutes to 15 hours in the presence of a Friedel-Crafts catalyst, and recovering said aromatic hydrocarbon resins thus produced, wherein said rate of conjugated diolefin content, in percent, is calculated by dividing the weight percent conjugated diolefin content in said first fraction by the weight percent of the total polymerizable component in said first fraction and multiplying by 100, and wherein said rate of indene content, in percent, is calculated by dividing the weight percent of the content of indene and its alkyl derivatives in the fraction by the weight percent of the total polymerizable component in the fraction and multiplying by 100.

2. The process of claim 1 wherein said aromatic hydrocarbon resins are recovered by decomposing and removing said catalyst and separating unreacted oils and low polymers from the reaction products.

3. The process of claim 2 wherein the unreacted oils and low polymers are separated from the reaction products by evaporation or distillation.

4. The process of claim 3 wherein said hydrocarbon fraction is obtained from the steam cracking of petroleum.

5. The process of claim 1 wherein said hydrocarbon fraction is obtained by the steam cracking of petroleum.

References Cited
UNITED STATES PATENTS

| | | | |
|---|---|---|---|
| 3,676,412 | 7/1972 | Winkler et al. | 260—82 |
| 2,193,792 | 3/1940 | Wilson | 260—82 |
| 2,846,419 | 8/1958 | Moak | 260—82 |
| 2,849,512 | 8/1958 | Banes et al. | 260—82 |
| 2,856,389 | 10/1958 | Fusco et al. | 260—82 |
| 2,946,775 | 7/1960 | De Vries et al. | 260—82 |
| 3,468,837 | 9/1969 | Wheeler et al. | 260—82 |
| 2,507,338 | 5/1950 | Heiligmann | 260—93.5 S |

HARRY WONG, JR., Primary Examiner

U.S. Cl. X.R.

117—124, 161; 204—159.14; 260—23.3, 28.5 R, 31.8 M, 33.6 UA